United States Patent
Fujioka et al.

(10) Patent No.: US 12,001,646 B2
(45) Date of Patent: Jun. 4, 2024

(54) COMPUTER-IMPLEMENTED METHOD, COMPUTER, AND PROGRAM FOR RENDERING A THREE-DIMENSIONAL OBJECT IN A VIRTUAL REALITY SPACE

(71) Applicant: Wacom Co., Ltd., Saitama (JP)

(72) Inventors: Hiroshi Fujioka, Saitama (JP); Naoya Nishizawa, Saitama (JP); Kenton J. Loftus, Portland, OR (US); Milen Dimitrov Metodiev, Sofia (BG); Markus Weber, Düesseldorf (DE); Anthony Ashton, Portland, OR (US)

(73) Assignee: Wacom Co., Ltd., Saitama (JP)

(*) Notice: Subject to any disclaimer, the term of this patent is extended or adjusted under 35 U.S.C. 154(b) by 0 days.

(21) Appl. No.: 18/153,906

(22) Filed: Jan. 12, 2023

(65) Prior Publication Data

US 2023/0144941 A1    May 11, 2023

Related U.S. Application Data (63) Continuation of application No. PCT/JP2021/027654, filed on Jul. 27, 2021.

(30) Foreign Application Priority Data

Jul. 27, 2020    (JP) .................. 2020-126651

(51) Int. Cl.
    *G06F 3/04815*    (2022.01)
    *G06F 3/04883*    (2022.01)
    *G06T 19/00*    (2011.01)

(52) U.S. Cl.
    CPC ...... *G06F 3/04815* (2013.01); *G06F 3/04883* (2013.01); *G06T 19/006* (2013.01)

(58) Field of Classification Search
    CPC .. G06F 3/04815; G06F 3/04883; G06F 3/011; G06F 3/014; G06F 3/03545;
    (Continued)

(56) References Cited

U.S. PATENT DOCUMENTS 6,842,175 B1 * 1/2005 Schmalstieg ........... G06F 3/011
                                                      345/427
9,153,062 B2 * 10/2015 Dorsey ................... G06T 11/60
(Continued)

FOREIGN PATENT DOCUMENTS

JP    2007-249419 A    9/2007
JP    2019-101945 A    6/2019
(Continued)

OTHER PUBLICATIONS

Ivan Poupyrev, Numada Tomokazu, Suzanne Weghorst, Virtual Notepad: Handwriting in Immersive VR, retrieved from—https://ieeexplore.ieee.org/stamp/stamp.jsp?tp=&arnumber=658467, Mar. 14-18, 1998, 8 pages (Year: 1998).*

(Continued)

*Primary Examiner* — Yongjia Pan
(74) *Attorney, Agent, or Firm* — Seed IP Law Group LLP (57) ABSTRACT

According to one aspect, it becomes possible to easily modify a 3D object which is displayed in a virtual reality space.
A method is performed by a computer configured to be communicable with a position detection device that includes a drawing surface and that, in operation, detects a position of an electronic pen on the drawing surface. The method includes rendering, in a virtual reality space, a first object that is a 3D object, rendering, near the first object, a display surface that is a 3D object, rendering, on the display surface, a 3D line that is a 3D object generated based on the position of the electronic pen on the drawing surface, wherein the
(Continued)

position of the electronic pen is detected by the position detection device, and outputting the first object, the display surface, and the 3D line, which are the 3D objects, to a display.

12 Claims, 8 Drawing Sheets

(58) Field of Classification Search
CPC ....... G06F 3/04845; G06F 2203/04101; G06F 2203/04106; G06F 3/0421; G06F 3/044; G06F 3/046; G06T 19/006; G06T 19/00
See application file for complete search history.

(56) References Cited

U.S. PATENT DOCUMENTS

| | | | | |
|---|---|---|---|---|
| 10,509,865 | B2* | 12/2019 | Hackett | G06T 17/00 |
| 11,086,392 | B1* | 8/2021 | Sztuk | G06F 3/1423 |
| 11,087,561 | B2* | 8/2021 | Fu | G06T 19/006 |
| 11,262,857 | B2* | 3/2022 | Munakata | G06F 3/03545 |
| 2015/0293614 | A1* | 10/2015 | Kwak | G02F 1/0131 |
| | | | | 349/12 |
| 2015/0338934 | A1* | 11/2015 | Hawkins | H04N 23/00 |
| | | | | 345/157 |
| 2015/0363980 | A1 | 12/2015 | Dorta et al. | |
| 2018/0101986 | A1* | 4/2018 | Burns | G06T 19/006 |
| 2019/0042002 | A1* | 2/2019 | Robinson | G06F 3/03545 |
| 2019/0050132 | A1* | 2/2019 | Rawlings | G06F 3/04812 |
| 2019/0347865 | A1* | 11/2019 | Hackett | G06T 13/20 |
| 2020/0278763 | A1 | 9/2020 | Munakata et al. | |
| 2022/0091684 | A1* | 3/2022 | Hwang | G06F 3/03542 |
| 2023/0152963 | A1* | 5/2023 | Kim | G06F 3/04883 |
| | | | | 345/179 |

FOREIGN PATENT DOCUMENTS

| | | | |
|---|---|---|---|
| WO | WO 2018075054 | A1 | 4/2018 |
| WO | 2019/102825 | A1 | 5/2019 |
| WO | WO 2019102825 | A1 | 5/2019 |

OTHER PUBLICATIONS

Jaehyun Hanm Seongkook Heo, Hyong-Euk Lee, Geehyuk Lee, The IrPen: A 6-DOF Pen for Interaction with Tablet Computers, retrieved from—https://ieeexplore.ieee.org/document/6813983?source=IQplus, May 2014, 8 pages (Year: 2014).*

Daniele Giunchi, Stuart james, Donald Degraen, Anthony Steed, Mixing realities for sketch retrieval in Virtual Reality, retrieved from—https://arxiv.org/pdf/1910.11637.pdf, Jun. 3-5, 2018, 10 pages (Year: 2018).*

Drawing with a tablet and vr, retrieved from—https://upnalab.com/project/drawing-with-a-tablet-and-vr/, Nov. 22, 2019, 1 page (Year: 2019).*

International Search Report, dated Oct. 26, 2021, for International Application No. PCT/JP2021/027654, 4 pages.

Extended European Search Report dated Oct. 31, 2023, for the corresponding European Patent Application No. 21851104.6, 15 pages.

* cited by examiner

COMPUTER-IMPLEMENTED METHOD, COMPUTER, AND PROGRAM FOR RENDERING A THREE-DIMENSIONAL OBJECT IN A VIRTUAL REALITY SPACE

TECHNICAL FIELD

The present invention relates to a rendering method, a rendering device, and a program for rendering a 3D (Three-dimensional) object in a virtual reality (VR) space (including a VR space, an AR (augmented reality) space, and an MR (mixed reality) space).

BACKGROUND ART

In recent years, there has been an increasing need for capability to design various products while viewing 3D objects in a virtual reality space. Patent Document 1 discloses a technique that enables switching between display methods (a 3D display method or a 2D display method) for displaying a 3D object in a virtual reality space according to a user's selection.

PRIOR ART DOCUMENT

Patent Document

Patent Document 1: PCT Patent Publication No. WO 2019/102825

SUMMARY OF INVENTION

Technical Problems

Relatedly, in recent years, there has emerged a new need for capability to modify a 3D object, which is displayed in a virtual reality space, in the virtual reality space. However, according to the technique described in Patent Document 1, although a 3D object can be displayed in 3D, the 3D object needs to be displayed in 2D in order to enable a 2D input, and it has been difficult to easily modify the 3D object which is displayed in the virtual reality space.

Therefore, one of objects of the present invention is to provide a method performed by a computer, a rendering method, a computer, a rendering device, and a program that can easily modify a 3D object which is displayed in a virtual reality space.

Technical Solution

A method according to a first aspect of the present invention is a method performed by a computer configured to be communicable with a position detection device that includes a drawing surface and that, in operation, detects a position of an electronic pen on the drawing surface. The method includes rendering, in a virtual reality space, a first object that is a 3D object, rendering, near the first object, a display surface that is a 3D object, rendering, on the display surface, a 3D line that is a 3D object generated based on the position of the electronic pen on the drawing surface, wherein the position of the electronic pen is detected by the position detection device, and outputting the first object, the display surface, and the 3D line, which are the 3D objects, to a display.

A rendering method according to a second aspect of the present invention is a rendering method performed by a computer configured to be communicable with a position detection device that, in operation, detects a position of an electronic pen on a drawing surface and to render, in a virtual reality space, a 3D object stored in a memory. The rendering method includes a step of adding a 3D object constituting a display surface to the memory, a step of rendering, in the virtual reality space, one or more 3D objects stored in the memory, a step of converting the position indicated by the electronic pen and detected by the position detection device into a position in the virtual reality space coordinate system, and a step of placing a character or a figure that is drawn on the drawing surface, on the display surface, based on the position indicated by the electronic pen and converted by the converting step.

A computer according to the first aspect of the present invention is a computer configured to be communicable with a position detection device that includes a drawing surface and that, in operation, detects a position of an electronic pen on the drawing surface. The computer includes a control unit. The control unit, in operation, renders, in a virtual reality space, a first object that is a 3D object, renders, near the first object, a display surface that is a 3D object, renders, on the display surface, a 3D line that is a 3D object generated based on the position of the electronic pen on the drawing surface, wherein the position of the electronic pen is detected by the position detection device, and outputs the first object, the display surface, and the 3D line, which are the 3D objects, to a display.

A rendering device according to the second aspect of the present invention is a rendering device configured to be communicable with a position detection device that, in operation, detects a position of an electronic pen on a drawing surface and to render, in a virtual reality space, a 3D object stored in a memory. The rendering device, in operation, adds a 3D object constituting a display surface to the memory, renders, in the virtual reality space, one or more 3D objects stored in the memory, converts the position indicated by the electronic pen and detected by the position detection device into a position in the virtual reality space coordinate system, and places a character or a figure that is drawn on the drawing surface, on the display surface, based on the position indicated by the electronic pen and converted.

A program according to the first aspect of the present invention is a program for a computer configured to be communicable with a position detection device that includes a drawing surface and that, in operation, detects a position of an electronic pen on the drawing surface. The program causes the computer to perform processing of rendering, in a virtual reality space, a first object that is a 3D object, rendering, near the first object, a display surface that is a 3D object, rendering, on the display surface, a 3D line that is a 3D object generated based on the position of the electronic pen on the drawing surface, wherein the position of the electronic pen is detected by the position detection device, and outputting the first object, the display surface, and the 3D line, which are the 3D objects, to a display.

A program according to the second aspect of the present invention is a program for causing a computer to function as a rendering device configured to be communicable with a position detection device that, in operation, detects a position of an electronic pen on a drawing surface and to render, in a virtual reality space, a 3D object stored in a memory. The program causes the computer to perform a step of adding a 3D object constituting a display surface to the memory, a step of rendering, in the virtual reality space, one or more 3D objects stored in the memory, a step of converting the position indicated by the electronic pen and detected by the position detection device into a position in the virtual reality space coordinate system, and a step of placing a character or a figure that is drawn on the drawing surface, on the display surface, based on the position indicated by the electronic pen and converted by the converting step.

Advantageous Effects

According to the present invention, it is possible to provide a rendering method, a rendering device, and a program that can easily modify a 3D object which is displayed in a virtual reality space.

EMBODIMENTS FOR IMPLEMENTING THE INVENTION

Hereinafter, embodiments of the present invention are described in detail with reference to the accompanying drawings.

Figure 1:
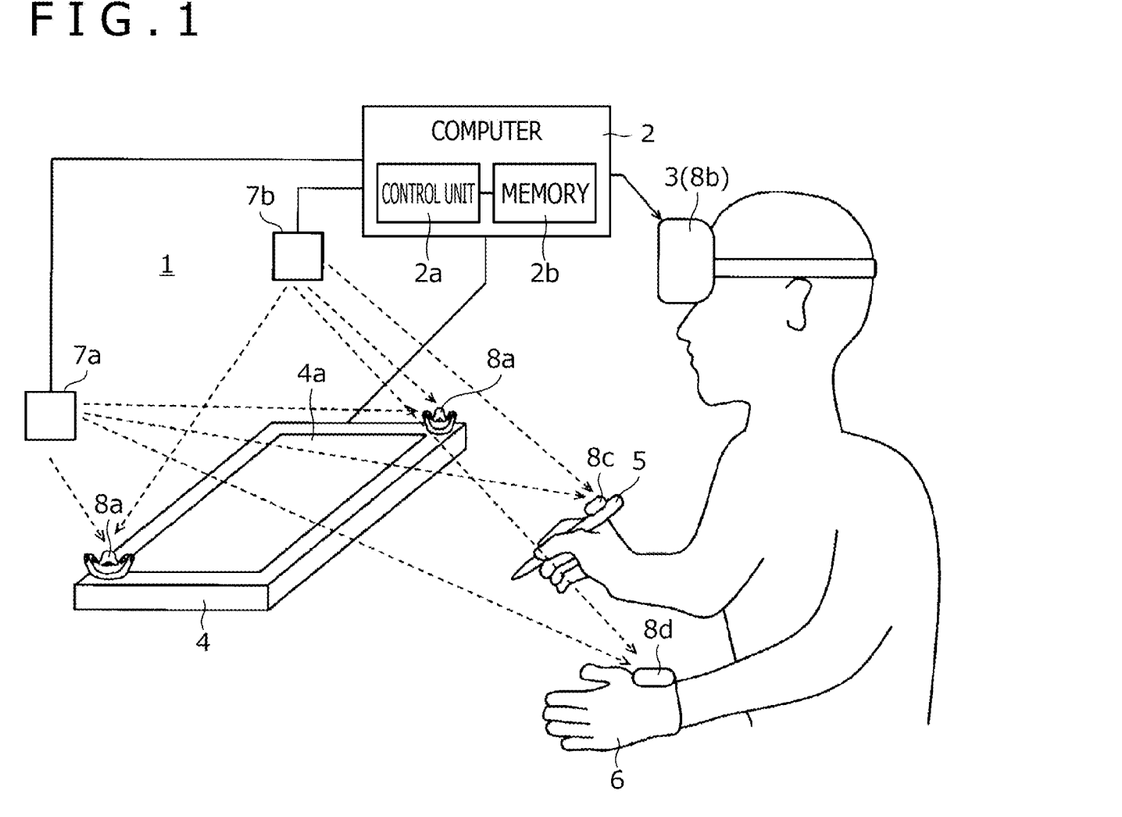
FIG. 1 is a diagram illustrating a configuration of a 3D object rendering system 1 according to an embodiment of the present invention.

FIG. 1 is a diagram illustrating a configuration of a 3D object rendering system 1 according to an embodiment of the present invention. As illustrated in FIG. 1, the 3D object rendering system 1 according to the present embodiment includes a computer 2, a virtual reality display 3, a position detection device 4 which includes a drawing surface 4a, an electronic pen 5 which has a pen-like shape, a glove unit 6 which can be worn on a user's hand, light emitting devices 7a and 7b, and position sensors 8a to 8d. The position sensors 8a, 8b, 8c, and 8d are attached to or built into the drawing surface 4a, the virtual reality display 3, the electronic pen 5, and the glove unit 6, respectively.

Each device illustrated in FIG. 1 is disposed in one room in one example. In the 3D object rendering system 1, the entirety of this room or a part of this room can be used as a virtual reality space.

The computer 2 includes a control unit 2a and a memory 2b. Each process performed by the computer 2 to be described later is realized by the control unit 2a reading and executing a program stored in the memory 2b.

The computer 2 is connected to each of the virtual reality display 3, the position detection device 4, and the light emitting devices 7a and 7b via, for example, a wired communication standard such as a USB (Universal Serial Bus) or a LAN (Local Area Network) or via, for example, a wireless communication standard such as a wireless LAN or a near-field communication standard. FIG. 1 illustrates an example in which the computer 2 is connected to each of the virtual reality display 3, the position detection device 4, and the light emitting devices 7a and 7b by wire. It is noted that, if the position detection device 4 or the virtual reality display 3 has a function as a computer, such computer may constitute the computer 2.

The control unit 2a has a function of displaying the virtual reality space on the virtual reality display 3. More specifically, the control unit 2a functions as a rendering device that sets the virtual reality space based on the positions of the light emitting devices 7a and 7b, that renders various 3D objects in the set virtual reality space, and that updates the display of the virtual reality display 3 based on the result of the rendering.

The virtual reality space set by the control unit 2a may be a VR space, an AR space, or an MR space. When the VR space is displayed, the user wearing the virtual reality display 3 recognizes the virtual reality and is disconnected from the real world. By contrast, when the AR space or the MR space is displayed, the user wearing the virtual reality display 3 recognizes a space in which the virtual reality and the real world are mixed. In the following description, it is assumed that the virtual reality space set by the control unit 2a is the VR space.

The rendering by the control unit 2a is performed based on one or more 3D objects stored in the memory 2b. A 3D object is information that indicates the shape, position, and orientation of the 3D object in the virtual reality space coordinate system indicating the virtual reality space set by the control unit 2a, and the 3D objects are stored in the memory 2b per each 3D object to be rendered. Although a specific data format of a 3D object is not particularly limited, for example, a VRML (Virtual Reality Modeling Language) format or an X3D format may be preferable.

The control unit 2a is configured to, prior to rendering, detect the position and orientation of the position sensor 8b in the virtual reality space coordinate system and obtain viewpoint information indicating the viewpoint of the user based on the detected position and orientation of the position sensor 8b. The rendering by the control unit 2a is performed based on the viewpoint information obtained in this way.

When the virtual reality space set by the control unit 2a is the VR space, the 3D objects stored in the memory 2b include 3D objects representing the respective ones of the position detection device 4, the electronic pen 5, and the glove unit 6 illustrated in FIG. 1. Hereinafter, the 3D object representing the position detection device 4 may be referred to as a "position detection device object." The 3D object representing the electronic pen 5 may be referred to as an "electronic pen object." The 3D object representing the glove unit 6 may be referred to as a "glove unit object." In rendering these 3D objects, the control unit 2a first detects the position and orientation of each of the position sensors 8a, 8c, and 8d in the virtual reality space coordinate system. Then, the control unit 2a updates the position detection device object based on the detected positions and orientations of the position sensors 8a, the electronic pen object based on the detected position and orientation of the position sensor 8*c*, and the glove unit object based on the detected position and orientation of the position sensor 8*d*.

The control unit 2*a*, which has updated each of the position detection device object, the electronic pen object, and the glove unit object, performs a process of rendering each updated object in the virtual reality space based on the viewpoint information described above. As a result, the position detection device object, the electronic pen object, and the glove unit object are displayed at their respective positions in the virtual reality space which respectively correspond to the real positions of the position detection device 4, the electronic pen 5, and the glove unit 6.

The control unit 2*a* also has a function of causing the electronic pen 5 and the glove unit 6 to function as 3D controllers. Specifically, the control unit 2*a* first detects the positions and orientations of the electronic pen 5 and the glove unit 6 by detecting the positions and orientations of the position sensors 8*c* and 8*d*. Further, each of the electronic pen 5 and the glove unit 6 includes one or more operation units that can be operated by the user. The control unit 2*a* receives operation information indicating the operation state of each operation unit from the electronic pen 5 and the glove unit 6. It is noted that the operation units are typically switches that are configured to be able to be turned on and off. In the following description, it is assumed that the operation units are switches. The control unit 2*a* is configured to detect the operation performed by the user in the virtual reality space, based on the positions, orientations, and the operation information obtained in this manner. Hereinafter, such operation detected in this manner may be referred to as a "3D operation" in order to distinguish it from a user operation detected by the position detection device 4 (an operation indicated by the indicated position and transmission data of the electronic pen 5, to be described later).

The 3D operation performed by the user in the virtual reality space includes an operation for creating a new 3D object or an operation for updating a 3D object. The control unit 2*a*, which has detected these operations, creates a new 3D object and adds it to the memory 2*b* or updates a 3D object stored in the memory 2*b* depending on the content of the operation.

The virtual reality display 3 is a VR display (head-mounted display) that is worn on the head of a human when used. There are various types of commercially available virtual reality displays such as a "transmissive type" or a "non-transmissive type," or a "glasses type" or a "hat type," and any of these virtual reality displays can be used as the virtual reality display 3.

The virtual reality display 3 is connected to each of the position sensors 8*a*, the electronic pen 5 (including the position sensor 8*c*), and the glove unit 6 (including the position sensor 8*d*) by wire or wirelessly. The position sensors 8*a*, 8*c*, and 8*d* are configured to use the connection to notify the virtual reality display 3 of light reception level information, to be described later. Further, the electronic pen 5 and the glove unit 6 are configured to notify the virtual reality display 3 of the operation information described above through this connection. The virtual reality display 3 is configured to notify the control unit 2*a* of the light reception level information and the operation information notified in this way, together with the light reception level information of the position sensor 8*b* incorporated in the virtual reality display 3. The control unit 2*a* detects the position and orientation of each of the position sensors 8*a* to 8*d* in the virtual reality space coordinate system based on the light reception level information notified in this way, and also detects the operation state of each of the switches disposed in the electronic pen 5 and the glove unit 6, based on the notified operation information.

The position detection device 4 is a device that has a function of detecting a position of the electronic pen 5 on the drawing surface 4*a* and receiving data transmitted from the electronic pen 5. The drawing surface 4*a* is preferably a flat surface and is made of a material suited for sliding a pen tip of the electronic pen 5 thereon. Typically, the position detection device 4 is what is called a digitizer and includes a touch sensor that detects a position indicated by the electronic pen 5 within the drawing surface 4*a*, and a communication function that notifies the control unit 2*a* of the detected indicated position. The drawing surface 4*a* in this case is formed by a drawing surface of the digitizer. The position detection device 4 may be what is called a tablet computer, and the drawing surface 4*a* in this case is formed by a display surface of a display.

The position sensors 8*a* are fixedly installed on the surface of the position detection device 4. Therefore, the positions and orientations of the position sensors 8*a* detected by the control unit 2*a* indicate the position and orientation of the drawing surface 4*a* in the virtual reality space coordinate system.

A two-dimensional drawing surface coordinate system that is different from the virtual reality space coordinate system is defined on the drawing surface 4*a*. The position indicated by the electronic pen 5 and detected by the touch sensor of the position detection device 4 is not a position in the virtual reality space coordinate system but a position in this drawing surface coordinate system.

The position detection of the electronic pen 5 by the touch sensor may use an electromagnetic induction method or an active capacitive method. When the active capacitive method is used, the touch sensor is configured to send out a beacon signal at predetermined time intervals from sensor electrodes disposed in the drawing surface 4*a*. The beacon signal includes a command for controlling the electronic pen 5 from the touch sensor. The content of the control by the command includes, for example, transmission of pen pressure data indicating a pressure applied to the pen tip of the electronic pen 5 (detected by a capacitance sensor), transmission of the operation states of various operation units disposed in the electronic pen 5, and transmission of a unique ID (Identification) pre-stored in the electronic pen 5. Typically, the operation units disposed in the electronic pen 5 also are switches configured to be able to be turned on and off, and in the following description, it is assumed that the operation units are switches.

When the electronic pen 5 supporting the active capacitive method detects the above-described beacon signal, the electronic pen 5 sends out a pen signal as a response signal. The pen signal is a signal including a burst signal which is an unmodulated carrier wave, and a data signal which is obtained by modulating a carrier wave with data corresponding to the above-described command. The touch sensor attempts to detect the burst signal using the above-described sensor electrodes, and to use the result of the detection to detect the position of the electronic pen 5. Further, the touch sensor detects the data signal using the sensor electrodes and demodulates the detected data signal, to thereby receive data transmitted from the electronic pen 5 in response to the command. The position detection device 4 is configured to transmit the position of the electronic pen 5 and the transmission data from the electronic pen 5 obtained in this way to the control unit 2*a* at each instance. The control unit 2*a* is configured to obtain the trajectory of the electronic pen 5 on the drawing surface 4*a* based on the series of positions notified in this way and also obtain the notified transmission data as the operation information of the electronic pen 5.

By contrast, when the electromagnetic induction method is used, the touch sensor includes a plurality of loop coils disposed in the drawing surface 4*a*. The touch sensor generates a magnetic field by applying a current signal to each loop coil and detects, at each loop coil, a reflection signal transmitted from the electronic pen 5 entering the magnetic field, to detect the position of the electronic pen 5 within the drawing surface 4*a*. Further, as with the active capacitive method, the reflection signal includes a portion modulated by data transmitted from the electronic pen 5 (data indicating the pen pressure data, the operation states of various switches, the unique ID, and the like). The touch sensor receives the data (data indicating the pen pressure data, the operation states of various switches, the unique ID, and the like) transmitted from the electronic pen 5, by demodulating the data signal detected by any one or more of the loop coils. Subsequent processing by the position detection device 4 and the control unit 2*a* is similar to the case of the active capacitive method.

Here, a 3D object created by the computer 2 in response to the 3D operation by the user includes a 3D object constituting a display surface for displaying characters and figures drawn on the drawing surface 4*a* of the position detection device 4 by the electronic pen 5. Hereinafter, this 3D object may be referred to as a "display surface object." A two-dimensional display surface coordinate system that is different from both the virtual reality space coordinate system and the drawing surface coordinate system is defined on a display surface of the display surface object.

When a new display surface object is created, the control unit 2*a* obtains first correspondence information which associates the display surface coordinate system of the display surface object and the drawing surface coordinate system with each other based on the respective sizes of the drawing surface 4*a* and the display surface. Further, the control unit 2*a* also obtains second correspondence information which associates the display surface coordinate system with the virtual reality space coordinate system based on the position, orientation, and size of the display surface object in the virtual reality space. Then, when the control unit 2*a* is supplied with the position indicated by the electronic pen 5 (the position in the drawing surface coordinate system) from the position detection device 4, the computer 2 first uses the first correspondence information to convert it into a position in the display surface coordinate system. Subsequently, the control unit 2*a* uses the second correspondence information to further convert the converted position into a position in the virtual reality space coordinate system. The control unit 2*a* is configured to generate a 3D object representing a character or figure drawn on the drawing surface 4*a*, based on the position in the virtual reality space coordinate system obtained in this way. Hereinafter, this 3D object may be referred to as a "2D-derived 3D object."

The 2D-derived 3D object is, from the user's perspective, a two-dimensional character or figure drawn on the display surface of the display surface object. However, since the 2D-derived 3D object is essentially a 3D object independent of the display surface object, 3D controllers such as the electronic pen 5 and the glove unit 6 can be used to perform a 3D operation on the 2D-derived 3D object, independently of the display surface object.

Figure 2:
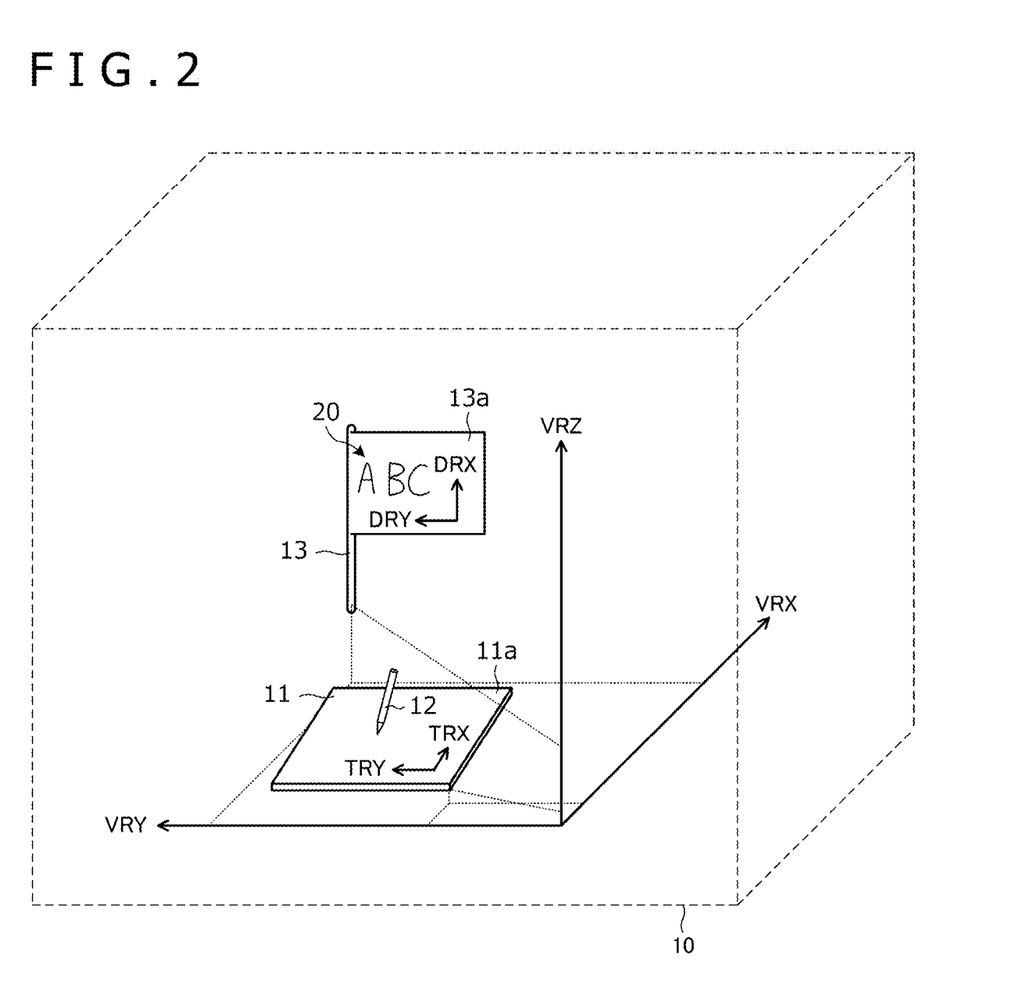
FIG. 2 is a diagram illustrating an example of a drawing surface coordinate system, a display surface coordinate system, and a virtual reality space coordinate system.

FIG. 2 is a diagram illustrating an example of the drawing surface coordinate system, the display surface coordinate system, and the virtual reality space coordinate system. FIG. 2 illustrates the state in which a position detection device object 11 which is a 3D object representing the position detection device 4, an electronic pen object 12 which is a 3D object representing the electronic pen 5, and a display surface object 13 which is an example of a 3D object forming the display surface, are rendered in a virtual reality space 10. The display surface object 13 has a flag-like shape, as illustrated in FIG. 2. A surface 11*a* of the position detection device object 11 corresponds to the drawing surface 4*a*, while a surface 13*a* of the display surface object 13 corresponds to the display surface.

Figure 3:
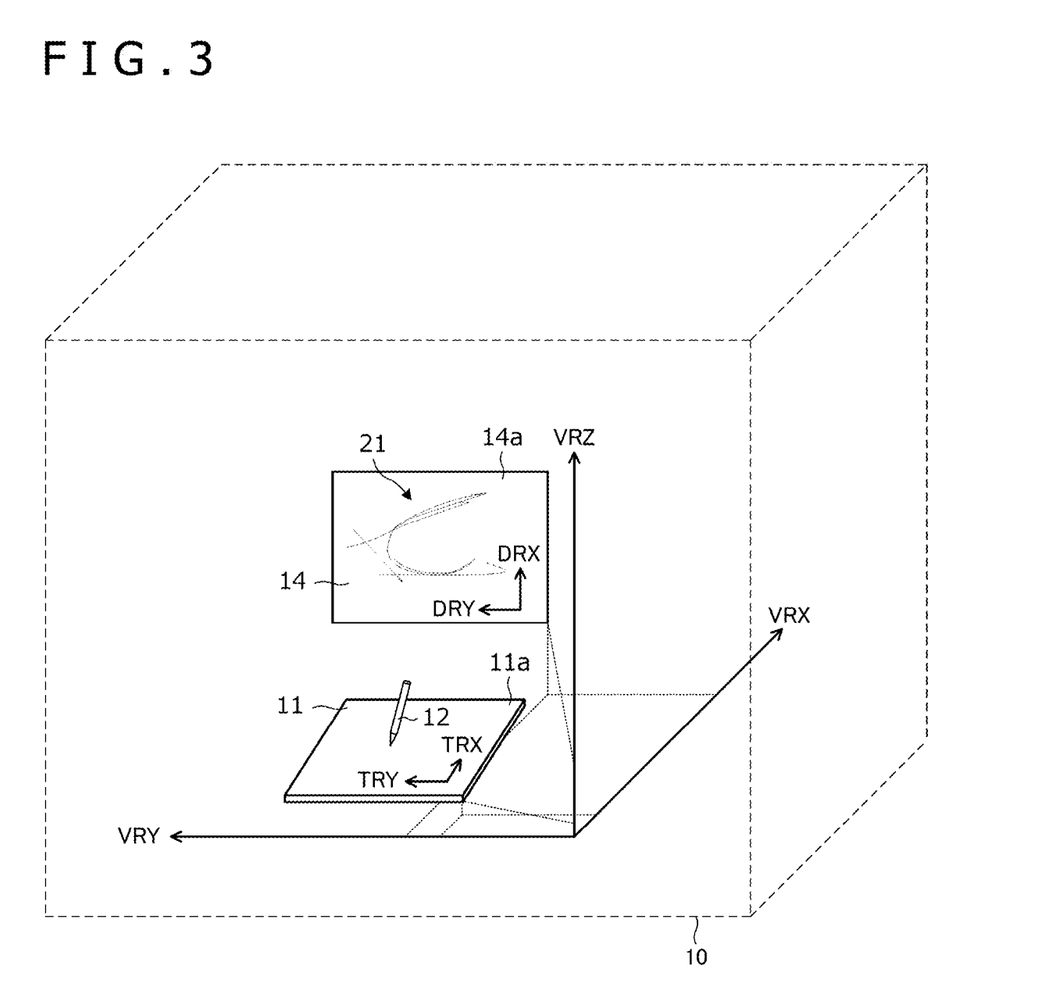
FIG. 3 is a diagram illustrating another example of the drawing surface coordinate system, the display surface coordinate system, and the virtual reality space coordinate system.

Further, FIG. 3 is a diagram illustrating another example of the drawing surface coordinate system, the display surface coordinate system, and the virtual reality space coordinate system. FIG. 3 illustrates the state in which a display surface object 14, which is another example of the 3D object constituting the display surface, is rendered in the virtual reality space 10 in addition to the position detection device object 11 and the electronic pen object 12, which are also illustrated in FIG. 2. The display surface object 14 has a simple rectangular shape (a rectangular parallelepiped with a small thickness) as illustrated in FIG. 3. A surface 14*a* of the display surface object 14 corresponds to the display surface.

As illustrated in FIGS. 2 and 3, the virtual reality space coordinate system is defined by three axes VRX, VRY, and VRZ, the drawing surface coordinate system is defined by two axes TRX and TRY, and the display surface coordinate system is represented by two axes DRX and DRY. When the user moves the electronic pen 5 on the drawing surface 4*a*, the position detection device 4 detects a series of positions indicating the trajectory of the electronic pen 5 and transmits them to the computer 2. It is noted that, when the virtual reality display 3 displays the VR space, the user cannot view the position detection device 4 and the electronic pen 5. However, as described above, the position detection device object 11 is displayed at a position in the virtual reality space corresponding to the real position of the position detection device 4, and the electronic pen object 12 is displayed at a position in the virtual reality space corresponding to the real position of the electronic pen 5.

The computer 2 converts each position (each position in the drawing surface coordinate system) received from the position detection device 4 into a position in the virtual reality space coordinate system using the first correspondence information and the second correspondence information as described above. Then, the computer 2 generates a 3D object based on the converted positions and the operation information of the electronic pen 5 received from the position detection device 4, to generate a 2D-derived 3D object representing a character or a figure drawn by the user on the drawing surface 4*a*. It is noted that the operation information of the electronic pen 5 is used to control, for example, the line width, color, transparency, and the like, of the character or the figure. A 3D object 20 which represents a character string "ABC" illustrated in FIG. 2 represents a 2D-derived 3D object generated in this way. The user can operate on the 3D object 20, independently of the display surface object 13, by using the electronic pen 5 or the glove unit 6 as the 3D controller.

Return to FIG. 1. The light emitting devices 7*a* and 7*b* are signal transmission devices for position detection used in the 3D object rendering system 1. Each of the light emitting devices 7*a* and 7*b* is configured to be able to emit a predetermined signal (laser light) while changing its direction under the control of the computer 2. Each of the position sensors 8*a* to 8*d* includes a plurality of light receiving sensors. The position sensors 8a to 8d are configured to receive the signal (laser light) emitted from each of the light emitting devices 7a and 7b, using each light receiving sensor, to obtain light reception level information including respective light reception levels. As described above, the respective position sensors 8a to 8d notify the computer 2 of the light reception level information, which is then used to detect the positions and orientations of the position sensors 8a to 8d.

An overall outline of the 3D object rendering system 1 has been described above. Next, the processing performed by the control unit 2a of the computer 2 to perform a 2D input, in the state in which a 3D object to be modified is displayed in 3D, is described in detail with reference to a processing flow diagram of the control unit 2a.

Figure 4:
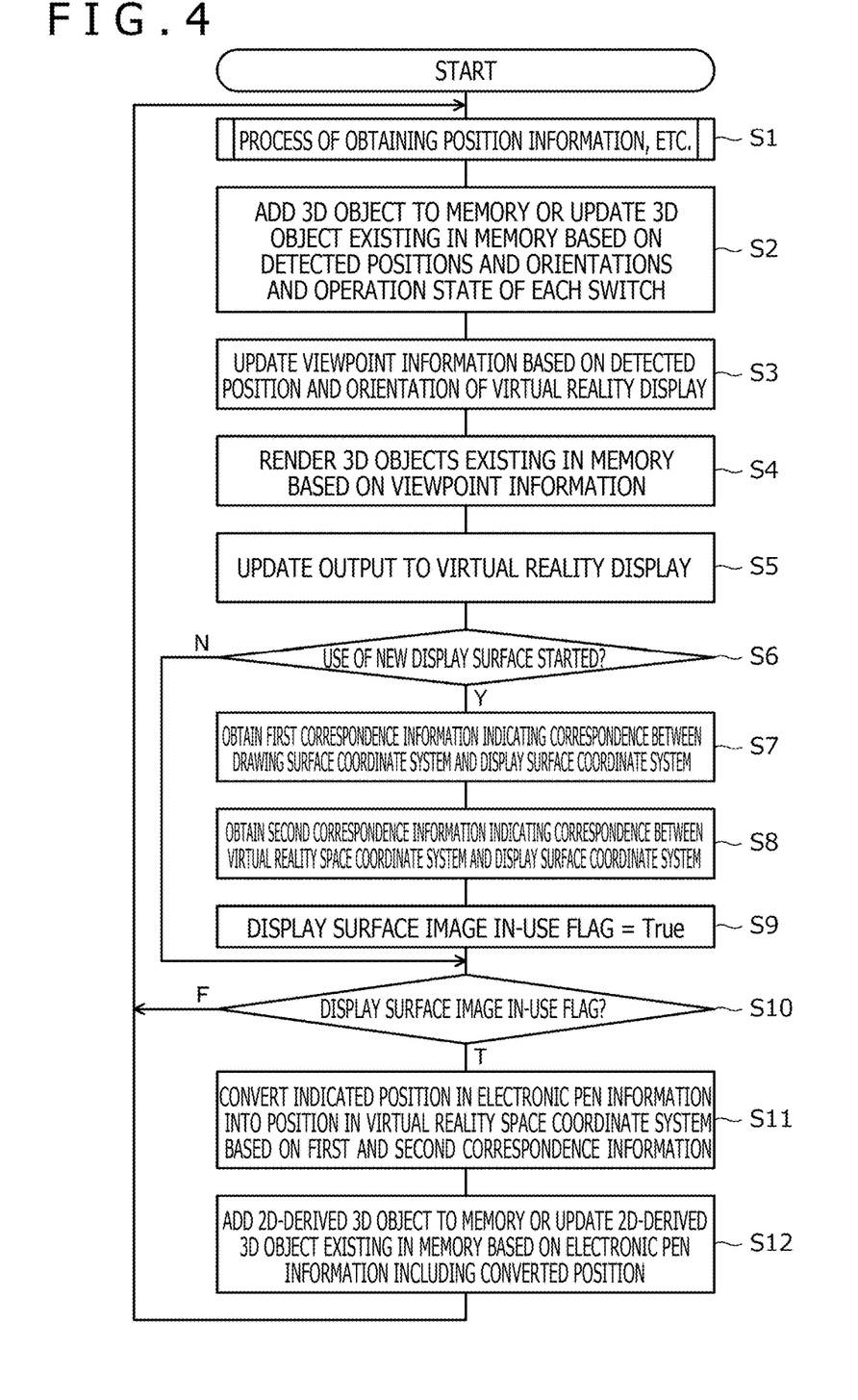
FIG. 4 is a flow diagram illustrating processing performed by a control unit 2a illustrated in FIG. 1.

FIG. 4 is a flow diagram illustrating the processing performed by the control unit 2a of the computer 2. As illustrated in FIG. 4, the control unit 2a first performs a process of obtaining position information and the like (step S1).

Figure 5:
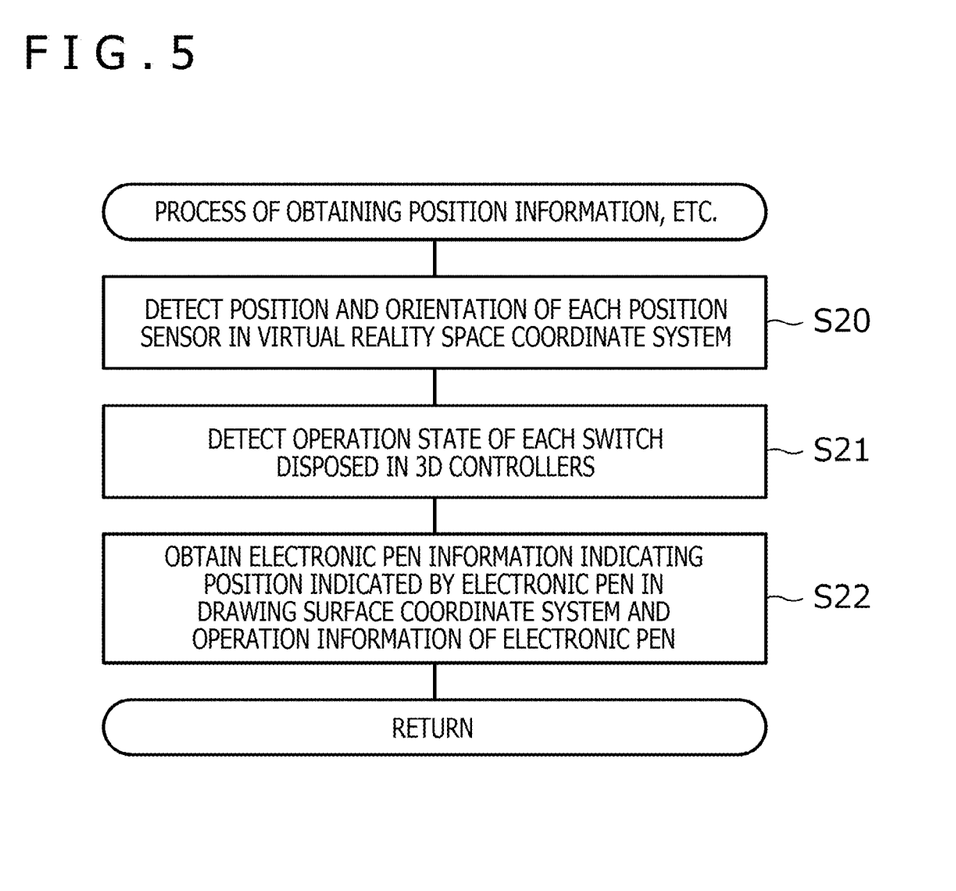
FIG. 5 is a flow diagram illustrating the details of a process of obtaining position information and the like illustrated in FIG. 4.

FIG. 5 is a flow diagram illustrating the details of the process of obtaining the position information and the like performed in step S1. It is noted that the processes of steps S20 to S22 described below may be performed in any order and may be performed in the order different from the order described in FIG. 5.

As illustrated in FIG. 5, the control unit 2a first detects the position and orientation of each of the position sensors 8a to 8d in the virtual reality space coordinate system based on the light reception level information of each of the position sensors 8a to 8d notified from the virtual reality display 3 (step S20). Accordingly, the control unit 2a obtains the position and orientation of each of the virtual reality display 3, the drawing surface 4a, the electronic pen 5, and the glove unit 6 in the virtual reality space coordinate system.

Next, the control unit 2a detects the operation state of each switch disposed in one or more 3D controllers (specifically, the electronic pen 5 and the glove unit 6; the same applies hereinafter) based on the operation information of each of the 3D controllers notified from the virtual reality display 3 (step S21).

Moreover, the control unit 2a obtains electronic pen information indicating the position indicated by the electronic pen 5 in the drawing surface coordinate system and the operation information of the electronic pen 5, based on the position of the electronic pen 5 and the transmission data of the electronic pen 5 supplied from the position detection device 4 (step S22). The control unit 2a, which has ended steps S20 to S22, ends the process of obtaining the position information and the like and advances the processing to step S2 of FIG. 4.

Returning to FIG. 4, the control unit 2a, which has ended the process of obtaining the position information and the like, adds a 3D object to the memory 2b or updates a 3D object existing in the memory 2b based on the positions and orientations detected in step S20 and the operation state of each switch detected in step S21 (step S2).

The process of step S2 is described in more detail. The control unit 2a performs a process of adding a 3D object to the memory 2b or updating a 3D object existing in the memory 2b, based on the positions and orientations of the detected 3D controllers and the content of the 3D operation indicated by the operation state of each switch disposed in the 3D controllers. For example, when the content of the 3D operation indicates addition of a display surface object, the control unit 2a adds the new display surface object to the memory 2b based on the content of the 3D operation.

Further, when the content of the 3D operation indicates updating of a 3D object (including the display surface object) already stored in the memory 2b, the control unit 2a updates the 3D object based on the content of the 3D operation.

Further, in step S2, the control unit 2a also performs a process of updating the position detection device object 11 existing in the memory 2b based on the detected position and orientation of the drawing surface 4a, a process of updating the electronic pen object 12 existing in the memory 2b based on the detected position and orientation of the electronic pen 5, and a process of updating the glove unit object existing in the memory 2b based on the detected position and orientation of the glove unit 6.

Next, the control unit 2a updates viewpoint information indicating the viewpoint of the user in the virtual reality space, based on the detected position and orientation of the virtual reality display 3 (step S3). The specific viewpoint information includes, for example, vector information having a set of three-dimensional coordinates as a starting point, and is held by the control unit 2a as one of variables.

Subsequently, the control unit 2a renders each 3D object existing in the memory 2b based on the updated viewpoint information (step S4), and based on the result of step S4 updates the output to the virtual reality display 3 (step S5). This allows the user to visually recognize the latest 3D objects existing in the memory 2b in the virtual reality space.

Next, the control unit 2a determines whether or not the use of a new display surface has started (step S6). The result of this determination is positive when a new display surface object is added in step S2, and is negative otherwise. The control unit 2a which has obtained a positive result in step S6 sets the display surface coordinate system to the display surface that is newly started to be used, and obtains first correspondence information indicating a correspondence between the previously stored drawing surface coordinate system and the set display surface coordinate system (step S7). The first correspondence information is used to convert the two-dimensional coordinates on the drawing surface 4a into the two-dimensional coordinates on the display surface. The control unit 2a further obtains second correspondence information indicating a correspondence between the previously stored virtual reality space coordinate system and the newly set display surface coordinate system (step S8). The second correspondence information is used to convert the two-dimensional coordinates on the display surface into the three-dimensional coordinates in the virtual reality space. Finally, the control unit 2a sets a display surface image in-use flag to True (step S9) and advances the processing to step S10. Here, the display surface image in-use flag is a boolean variable whose initial value is False. The control unit 2a which has obtained a negative result in step S6 advances the processing to step S10 without performing steps S7 to S9.

Next, the control unit 2a determines the value of the display surface image in-use flag (step S10). When the control unit 2a determines in step S10 that the value of the display surface image in-use flag is False, the control unit 2a returns to step S1 and repeats the processing. In this case, no 2D-derived 3D object is added or updated. On the other hand, when the control unit 2a determines that the value of the display surface image in-use flag is True, the control unit 2a performs a process of converting the indicated position in the electronic pen information, which is obtained in step S22, into a position in the virtual reality space coordinate system based on the obtained first and second correspondence information (step S11). Specifically, the control unit 2a first uses the first correspondence information to convert the indicated position of the electronic pen 5 supplied from the position detection device 4 into a position in the display surface coordinate system. Then, the control unit 2a uses the second correspondence information to further convert the converted position into a position in the virtual reality space coordinate system, thereby converting the indicated position in the electronic pen information into the position in the virtual reality space coordinate system.

Next, the control unit 2a adds a 2D-derived 3D object to the memory 2b or updates a 2D-derived 3D object existing in the memory 2b based on the electronic pen information including the converted position (step S12). The 2D-derived 3D object added or updated in this way appears to be a two-dimensional character or figure, as described above. However, its essence is a 3D object independent of the display surface, and it even has a small thickness. Therefore, the 3D operation can be performed on the 2D-derived 3D object by the electronic pen 5 and the glove unit 6 as the 3D controllers, independently of the 3D object constituting the display surface. When the user performs such 3D operation, the control unit 2a obtains the content of the 3D operation in steps S20 and S21 described above, and updates the 2D-derived 3D object existing in the memory 2b in step S2. The control unit 2a, which has ended step S12, returns to step S1 and repeats the processing.

Figure 6:
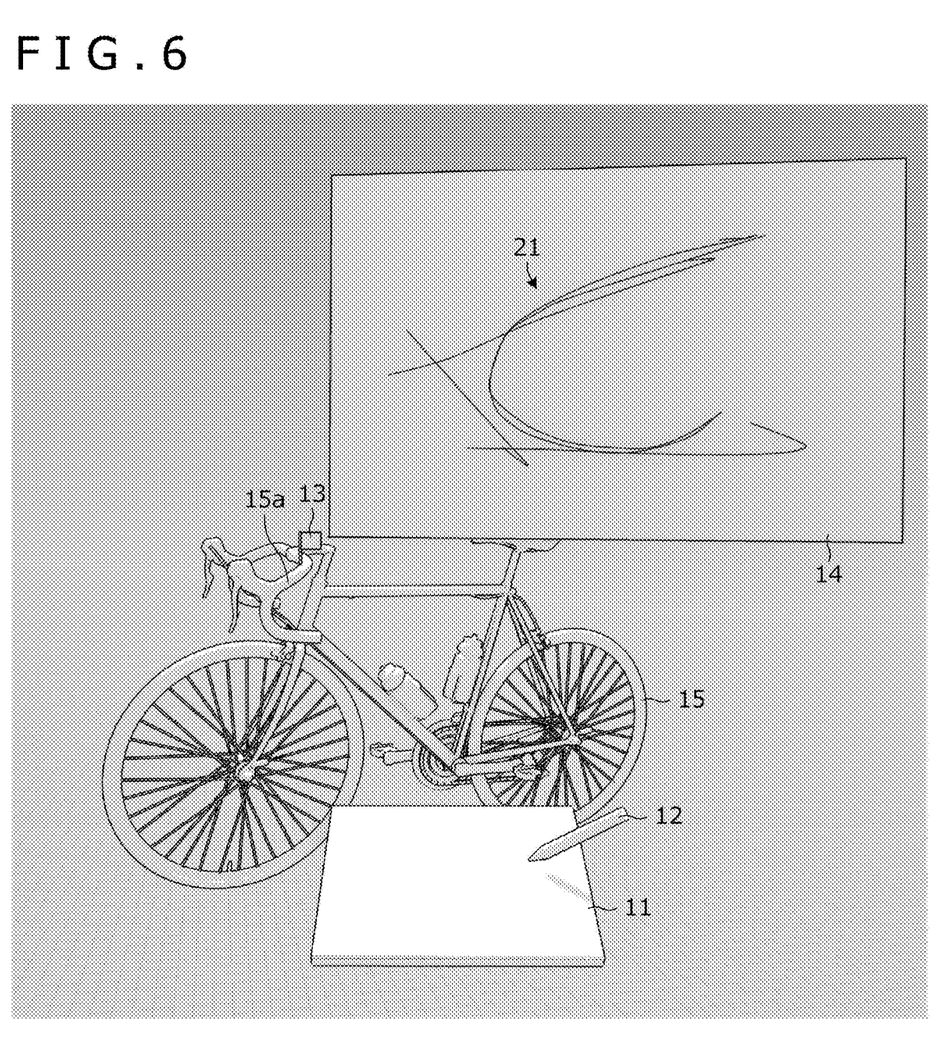
FIG. 6 is a view illustrating an example of a case where, in the state in which a 3D object to be modified is displayed in 3D, a modification instruction is provided using a high-precision 2D input.
Figure 7:
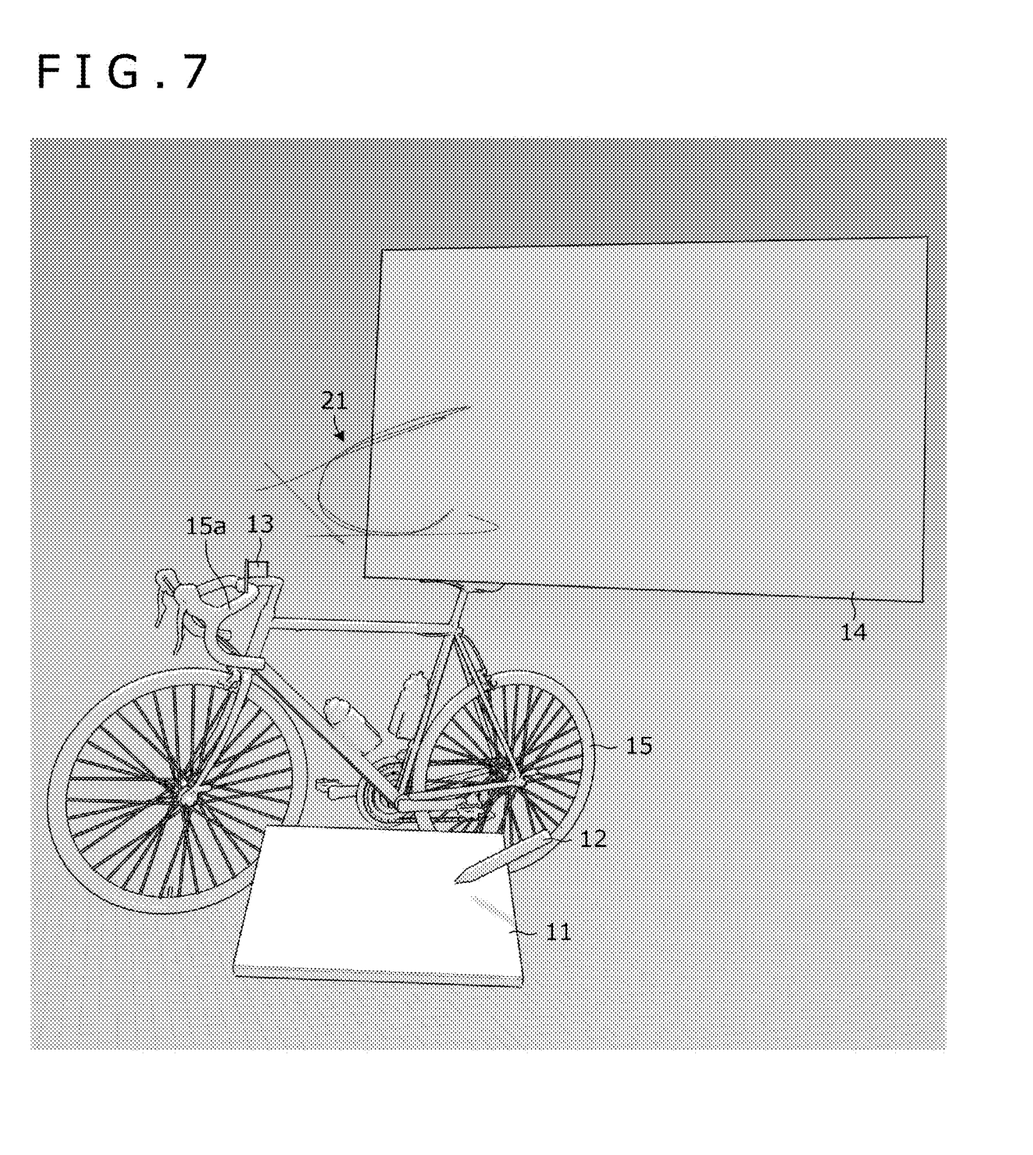
FIG. 7 is a view illustrating the example of the case where, in the state in which the 3D object to be modified is displayed in 3D, the modification instruction is provided using the high-precision 2D input.
Figure 8:
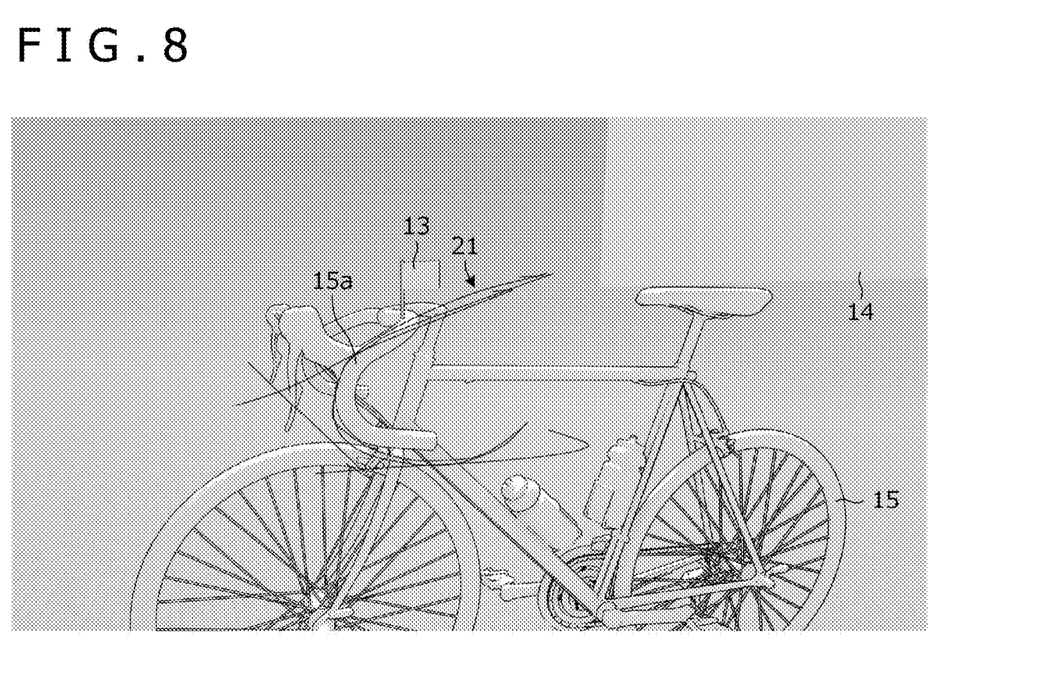
FIG. 8 is a view illustrating the example of the case where, in the state in which the 3D object to be modified is displayed in 3D, the modification instruction is provided using the high-precision 2D input.

FIGS. 6 to 8 are views illustrating an example of a case where, in the state in which a 3D object to be modified is displayed in 3D, a 2D input is performed. In the virtual reality space illustrated in these figures, the position detection device object 11, the electronic pen object 12, and the display surface object 13, as illustrated in FIG. 2, are displayed, together with the display surface object 14 different from the display surface object 13, as well as a 3D object 15 to be modified.

The two display surface objects 13 and 14 are added to the memory 2b in this order. Therefore, the current first and second correspondence information indicates a correspondence with the display surface coordinate system of the display surface object 14. When the user draws a character or a figure on the drawing surface 4a by using the electronic pen 5, the control unit 2a generates a 2D-derived 3D object on the display surface of the display surface object 14. A 3D object 21 illustrated represents the 2D-derived 3D object generated in this way.

The 3D object 15 to be modified is a 3D object having the shape of a bicycle in this example. A user viewing the virtual reality space in this example is, for example, a supervisor of another user (subordinate) who has placed the 3D object 15 in the virtual reality space. The supervisor may be thinking of instructing the subordinate to modify a portion corresponding to a handlebar 15a of the 3D object 15. In this case, the user first operates the electronic pen 5 or the glove unit 6 as the 3D controller to place the display surface object 13, which has a flag-like shape, on the portion of the handlebar 15a. Then, when the user writes, within the drawing surface 4a using the electronic pen 5, text for instructing a modification or the like (for example, "please modify as directed"), a 2D-derived 3D object representing the text is placed on the display surface of the display surface object 13.

Subsequently, the user places the display surface object 14, which has a larger display surface, near the 3D object 15 by operating the electronic pen 5 or the glove unit 6 as the 3D controller. Then, as illustrated in FIG. 6, when the user draws a figure representing the content of the modification within the drawing surface 4a using the electronic pen 5, the 3D object 21 representing the drawn figure is placed on the display surface of the display surface object 14.

Since the 3D object 21 placed in this way is a 3D object different from the display surface object 14, the 3D object 21 can be operated on independently of the display surface object 14. Accordingly, as illustrated in FIG. 7, the user may grab the 3D object 21 using the electronic pen 5 or the glove unit 6 as the 3D controller, and take the 3D object 21 out from the display surface of the display surface object 14 and, as illustrated in FIG. 8, move the 3D object 21 to a position overlapping with the handlebar 15a. Accordingly, the subordinate user who later views the virtual reality space can precisely understand the content of the modification directed by the supervisor.

As described above, with the 3D object rendering system 1 according to the present embodiment, in the state in which a display surface object is displayed in 3D together with other 3D objects, characters and figures can be drawn within the display surface by operating the electronic pen 5 on the drawing surface 4a. Therefore, in the state in which a 3D object to be modified is displayed in 3D, it is possible to use a 2D input to thereby input a modification content with high precision.

Further, since characters and figures themselves drawn on the display surface are 2D-derived 3D objects which are different from the display surface object, the user can move the drawn characters and figures to any positions within the virtual reality space, independently from the display surface object. Therefore, it is possible to direct modification of a 3D object in a clearly understandable manner.

Although the preferred embodiments of the present invention have been described above, the present invention is by no means limited to the above-described embodiments. As a matter of course, the present invention can be implemented in various embodiments without departing from the scope of the present invention.

For example, in the above-described embodiments, the example has been described in which the present invention is applied to the 3D object rendering system 1 of the type in which the position and orientation of an object in the real space are detected using the light emitting devices 7a and 7b and the position sensors 8a to 8d. However, the present invention can similarly be applied to a 3D object rendering system of the type in which cameras are disposed instead of the individual light emitting devices 7a and 7b, in which markers are disposed instead of the individual position sensors 8a to 8d, and in which the positions and orientations of objects in the real space are detected by detecting the markers based on the imaging results captured by the cameras.

DESCRIPTION OF REFERENCE SYMBOLS

1: 3D object rendering system
2: Computer
2a: Control unit
2b: Memory
3: Virtual reality display
4: Position detection device
4a: Drawing surface
5: Electronic pen
6: Glove unit
7a, 7b: Light emitting device
8a to 8d: Position sensor
10: Virtual reality space
11: Position detection device object
11a: Surface 12: Electronic pen object
13, 14: Display surface object
13a, 14a: Surface
15: 3D object to be modified
15a: Handlebar
20, 21: 2D-derived 3D object

The invention claimed is:

1. A method performed by a computer configured to be communicable with a position detection device that includes a drawing surface and that, in operation, detects a position of an electronic pen on the drawing surface, the method comprising:
rendering, in a virtual reality space, a first object that is a three-dimensional object;
rendering, near the first object, a display surface that is a three-dimensional object;
rendering, on the display surface, a three-dimensional line that is a three-dimensional object generated based on the position of the electronic pen on the drawing surface, wherein the position of the electronic pen is detected by the position detection device;
outputting the first object, the display surface, and the three-dimensional line, which are the three-dimensional objects, to a display;
obtaining first correspondence information indicating a correspondence between a first coordinate system defined on the drawing surface and a second coordinate system defined on the display surface;
obtaining second correspondence information indicating a correspondence between the second coordinate system and a third coordinate system indicating the virtual reality space; and
converting the position of the electronic pen into a position in the third coordinate system based on the first correspondence information and the second correspondence information.

2. The method according to claim 1, further comprising:
causing the three-dimensional line to move according to an operation of a three-dimensional controller.

3. The method according to claim 2, wherein the three-dimensional controller is the electronic pen.

4. The method according to claim 3, further comprising:
further detecting a position and an orientation of the electronic pen based on light reception level information from a position sensor attached to the electronic pen; and
causing the three-dimensional line to move based on the detected position and orientation of the electronic pen.

5. The method according to claim 3, further comprising:
detecting an operation state of an operation unit included in the electronic pen; and
causing the three-dimensional line to move based on the detected operation state of the operation unit.

6. The method according to claim 1, further comprising:
updating viewpoint information indicating a viewpoint of a user in the virtual reality space, based on a position and an orientation of a virtual reality display in the third coordinate system indicating the virtual reality space; and
performing rendering based on the viewpoint information.

7. A computer configured to be communicable with a position detection device that includes a drawing surface and that, in operation, detects a position of an electronic pen on the drawing surface, the computer comprising:
a control unit,
wherein the control unit, in operation,
renders, in a virtual reality space, a first object that is a three-dimensional object,
renders, near the first object, a display surface that is a three-dimensional object,
renders, on the display surface, a three-dimensional line that is a three-dimensional object generated based on the position of the electronic pen on the drawing surface, wherein the position of the electronic pen is detected by the position detection device,
outputs the first object, the display surface, and the three-dimensional line which are the three-dimensional objects, to a display;
obtains first correspondence information indicating a correspondence between a first coordinate system defined on the drawing surface and a second coordinate system defined on the display surface;
obtains second correspondence information indicating a correspondence between the second coordinate system and a third coordinate system indicating the virtual reality space; and
converts the position of the electronic pen into a position in the third coordinate system based on the first correspondence information and the second correspondence information.

8. The computer according to claim 7, wherein the three-dimensional line is caused to move according to an operation of a three-dimensional controller.

9. The computer according to claim 8, wherein the three-dimensional controller is the electronic pen.

10. A non-transitory computer-readable medium including a computer-executable program for a computer configured to be communicable with a position detection device that includes a drawing surface and that, in operation, detects a position of an electronic pen on the drawing surface, the program causing the computer to perform processing of:
rendering, in a virtual reality space, a first object that is a three-dimensional object;
rendering, near the first object, a display surface that is a three-dimensional object;
rendering, on the display surface, a three-dimensional line that is a three-dimensional object generated based on the position of the electronic pen on the drawing surface, wherein the position of the electronic pen is detected by the position detection device;
outputting the first object, the display surface, and the three-dimensional line which are the three-dimensional objects, to a display;
obtaining first correspondence information indicating a correspondence between a first coordinate system defined on the drawing surface and a second coordinate system defined on the display surface;
obtaining second correspondence information indicating a correspondence between the second coordinate system and a third coordinate system indicating the virtual reality space; and
converting the position of the electronic pen into a position in the third coordinate system based on the first correspondence information and the second correspondence information.

11. The medium according to claim 10, wherein the program causes the computer to perform processing of causing the three-dimensional line to move according to an operation of a three-dimensional controller.

12. The medium according to claim 11, wherein the three-dimensional controller is the electronic pen.

\* \* \* \* \*